Patented June 26, 1945

2,379,345

UNITED STATES PATENT OFFICE 2,379,345

PREPARATION OF OIL RESISTING RUBBERS

Ernest Harold Farmer, Radlett, England, assignor to The British Rubber Producers' Research Association, London, England, a body corporate of Great Britain No Drawing. Application September 14, 1942, Serial No. 458,319. In Great Britain December 24, 1940

6 Claims. (Cl. 260—768)

This invention relates to rubber derivatives with more especial reference to hydroxylated, acetylated, benzoylated or oxido derivatives for use in the preparation of oil resisting rubbers.

It is known that the characteristic properties of rubber can be modified by the introduction into the rubber molecules of various atoms and groups, especially groups of a strong polar character such as the hydroxyl group and/or its esterification products with organic acids.

It has now been found that rubbers having improved oil-resisting properties can be obtained by preparing oxygenated rubbers therefrom and cross-linking such oxygenated rubbers e. g. by vulcanisation or by the introduction of linkages, for instance oxygen bridges between molecules.

Broadly stated, the process according to the present invention consists first in the preparation of hydroxylated, acetylated, benzoylated or oxido derivatives of rubber by the action of lead tetracetate or of lead tetrabenzoate, preparing oxygenated rubbers therefrom and in cross-linking the oxygenated rubbers so obtained by suitable treatment.

The hydroxyl groups introduced are to a large extent esterified by the acetic or benzoic acids present and the corresponding hydroxyl compound may be generated by partial or complete hydrolysis of the ester-derivatives.

The oxidative-acetylation of rubber is brought about where crepe, acetone-extracted crepe, sol or other suitable form of rubber is heated with lead tetracetate and acetic acid in solvent which is resistant to the action of the lead tetracetate until the latter is consumed. The lead salts are removed from the reaction mixture and the acetylated rubbers recovered from solution preferably by evaporation. The higher the proportion of lead tetracetate which is employed, the higher is the acetyl content of the product. The acetylated products are obtained as pale yellow syrupy or tough and somewhat rubbery solid products.

These acetylated products can be deacetylated and so converted into the hydroxy-rubber by boiling their solutions in benzene or other suitable solvent with aqueous or alcoholic caustic soda (e. g. of N/1 strength), and then acidifying. The deacetylated products when recovered from solution form light brown somewhat sticky or otherwise tough and slightly rubbery solids; they are soluble in benzene, except those of the highest hydroxyl content, which are soluble in acetone.

Oxidative-benzoylation of rubber is carried out using lead tetrabenzoate in place of tetracetate, but in this case the rubber and lead tetrabenzoate are heated together in benzene solution without any acetic acid present. The benzoylated derivatives are obtained in the form of yellow syrup. These can be converted into the corresponding hydroxy-rubbers by boiling their solutions in a suitable solvent with alcoholic caustic soda.

One way in which oxygen bridges can be introduced between rubber molecules and the rubber thus rendered oil-resistant is by heating the hydroxylated rubber; in so heating (e. g. at 100° C. for half an hour) water is evolved, and from the amount of water evolved the number of oxygen bridges can be calculated on the assumption that one molecule of water is evolved for each oxygen bridge formed. Another way of obtaining products which are oil-resistant is by vulcanisation of the hydroxylated rubber.

The following examples illustrate the various forms of the derivatives:

EXAMPLE I 5 g. of sol rubber, dissolved in 250 cc. benzene, were added to a suspension of 8.1 g. of lead tetracetate (0.25 mol. per $C_5H_8$ unit) in 40 cc. of glacial acetic acid and 150 cc. benzene. The atmosphere over the mixture was replaced by dry nitrogen. The mixture was then refluxed with vigorous stirring for 8–10 hours, by the end of which period the lead tetracetate had been consumed. The mixture was allowed to cool and the solution was filtered off from the crystals of lead diacetate. The solution was then washed with water and sodium bicarbonate until free from acid and lead salts. It was dried over anhydrous sodium sulphate, and the clear solution was evaporated in a vacuum. The yellow residue (5 g.) was, when free from solvent, slightly sticky and tough, soluble in benzene and chloroform.

The product contained 7.7% acetyl.

The acetyl contents of the various products are shown by the following table.

| Mol tetracetate per $C_5H_8$ used | Percent acetyl in product |
|---|---|
| 1/8 | 2.7 |
| 1/6 | 4.4 |
| 1/4 | 7.7 |
| 1/2 | 15.6 |
| 1 | 27.4 |

De-acetylation of these products could be effected as follows:

5 g. of acetylated rubber, dissolved in 250 cc. of benzene was refluxed in an atmosphere of nitrogen with 100 cc. of N/1 methylalcoholic caustic soda for 4 hours. The mixture was allowed to cool and the alkali was then neutralised with dilute HCl. The benzene layer was washed with water, until free from acid, dried over sodium sulphate and evaporated in a vacuum. The deacetylated rubber (hydroxyrubber) was obtained as a light brown, tough and slightly rubbery material.

Yield: approximately 4 g.

EXAMPLE II 5 g. of sol rubber, dissolved in 250 cc. of dry benzene were added to a suspension of 34 g. of lead tetrabenzoate (0.5 mol per $C_5H_8$-unit) in 100 cc. of dry benzene. The atmosphere over the mixture was replaced by dry nitrogen. The mixture was then refluxed with vigorous stirring for 10 hours, by the end of which period the lead tetrabenzoate had been consumed. The mixture was allowed to cool and 200 cc. of ether were added, and the mixture was kept for 24 hours. The solution was then filtered off from the crystals of lead dibenzoate. The solution was washed with water and sodium carbonate until free from lead salts. It was dried over anhydrous sodium sulphate, and the clear solution was evaporated in a vacuum. The yellow residue (5 g.) was when free from solvent, slightly sticky and tough, soluble in benzene. The product contained 12.2% benzoyl.

The hydrolysis was carried out in the same way as described in Example I. The debenzoylated rubber (hydroxy-rubber) was obtained as a light brown tough and slightly rubbery material.

Yield: approximately 4 g.

EXAMPLE III

In the practice of the invention for the manufacture of oil-resisting rubbers from the described derivatives appropriate amounts of vulcanising and compounding ingredients, such as sulphur, zinc oxide and china clay are added and the mix vulcaised, when products having characteristics indicated in the following examples are obtained.

Three types of hydroxyrubbers, containing low, medium and high proportions of hydroxyl groups, were compounded. A control of pale crepe was run under identical conditions. Two different mixings were used:

Mixing 1

| | Parts by weight |
|---|---|
| Rubber or hydroxy rubber | 100 |
| Sulphur | 2 |
| Zinc oxide | 5 |
| Stearic acid | 1 |
| China clay | 100 |
| Zinc diethyl dithiocarbamate | 0.5 |

Mixing 2

| | |
|---|---|
| Rubber or hydroxy rubber | 100 |
| Sulphur | 5 |
| Zinc oxide | 5 |
| Stearic acid | 1 |
| China clay | 100 |
| Zinc diethyl dithiocarbamate | 0.5 |

The following figures were obtained with discs immersed in kerosene, weighed and measured after 3 and 7 days' immersion.

Mixing 1

| Oil absorption after— | Crepe control | Low hydroxyl | Medium hydroxyl | High hydroxyl |
|---|---|---|---|---|
| | Per cent | Per cent | Per cent | Per cent |
| 3 days | 93 | 73 | 61 | 24 |
| 7 days | 95 | 73 | 62 | 29 |

Mixing 2

| Oil absorption after— | Crepe control | Low hydroxyl | Medium hydroxyl | High hydroxyl |
|---|---|---|---|---|
| | Per cent | Per cent | Per cent | Per cent |
| 3 days | 65 | 48 | 39 | 20 |
| 7 days | 66 | 49 | 39 | 28 |

EXAMPLE IV

A specimen of oxido rubber which had been prepared according to Example II was compounded as in mixing 1 of Example III (but without china clay) and cured in the usual manner. A second specimen was cured in the same manner without any compounding. A control of pale crepe was run under identical conditions.

The following figures were obtained with discs immersed in kerosene, weighed after 3 days' immersion.

| Oil absorption after— | Crepe control | Oxido rubber compounded | Oxido rubber not compounded |
|---|---|---|---|
| | Per cent | Per cent | Per cent |
| 3 days | 236 | 0.0 | 0.0 |

EXAMPLE V

A sample of hydroxy rubber was prepared as in Example I. The oxygen content was 3.35% and the hydroxylic oxygen 1.4%. The dry material dissolved readily in a benzene-methyl alcohol mixture containing 150 cc. of methyl alcohol per 1 litre of mixture. The molecular weight calculated from the osmotic pressure of such a solution was 45,000. Samples of the dry material were heated in vacuo at 100° C. and the water evolved collected and measured.

After heating for ½ hr. the water evolution amounted to 0.16 mgm. per gm. of rubber. If each molecule of water represented the cross linking of 2 rubber molecules the molecular weight should have risen to 63,000. The product was still soluble but had now an osmotic molecular weight of 60,000.

Two further samples were heated for 6¼ hrs. and 21½ hrs. giving water evolution of 0.70 and 1.02 mg. per gm. of rubber respectively. These amounts should be sufficient to produce complete cross linking of the rubber. Actually the products, when shaken for several days with 50 times their weight of the benzene-methyl alcohol mixture, dissolved only to the extent of 54% and 35% respectively.

What I claim is:

1. In the manufacture of oil resisting rubber, a process comprising the steps of firstly preparing the derivatives of rubber by reacting rubber with a reagent from the class consisting of lead tetracetate and lead tetrabenzoate and then preparing hydroxylated rubbers from such derivatives by boiling with caustic alkali.

2. In the manufacture of oil resisting rubber according to claim 1 effecting the first reaction by heating the rubber with lead tetracetate and acetic acid in a solvent resistant to the action of the lead tetracetate, removing the lead salts from the reaction mixture and recovering the acetylated rubber from the solution preferably by evaporation.

3. In the manufacture of oil resisting rubber according to claim 1, the step of deacetylating the acetylated product by boiling its solution with aqueous or alcoholic caustic alkali and then acidifying to yield the hydroxylated derivative.

4. In the manufacture of oil resisting rubber according to claim 1 heating lead tetrabenzoate with the rubber in solution and converting the benzoylated products into corresponding hydroxy rubbers by boiling their solutions with alcoholic caustic alkali.

5. A process according to the preceding claim 1, wherein sol rubber in benzene is added to a suspension of lead tetracetate in glacial acetic acid and benzene, the mixture being refluxed and stirred in an atmosphere of nitrogen until the tetracetate is consumed and the acid and lead salts being then removed.

6. A process according to the preceding claim 1, wherein sol rubber in benzene is added to lead tetrabenzoate in the same solvent, the mixture refluxed in an atmosphere of nitrogen, allowed to cool, and the lead salts then removed.

ERNEST HAROLD FARMER.